(12) United States Patent
Blase

(10) Patent No.: US 11,988,312 B2
(45) Date of Patent: May 21, 2024

(54) MARKING ON INJECTION MOULDED PARTS FOR ENERGY GUIDING CHAINS

(71) Applicant: IGUS GMBH, Cologne (DE)

(72) Inventor: Frank Blase, Bergisch Gladbach (DE)

(73) Assignee: IGUS GMBH, Cologne (DE)

( * ) Notice: Subject to any disclaimer, the term of this patent is extended or adjusted under 35 U.S.C. 154(b) by 575 days.

(21) Appl. No.: 15/733,733

(22) PCT Filed: Apr. 9, 2019

(86) PCT No.: PCT/EP2019/058926
§ 371 (c)(1),
(2) Date: Oct. 8, 2020

(87) PCT Pub. No.: WO2019/197392
PCT Pub. Date: Oct. 17, 2019

(65) Prior Publication Data
US 2021/0033219 A1  Feb. 4, 2021

(30) Foreign Application Priority Data

Apr. 12, 2018  (DE) .................... 20 2018 102 000.5

(51) Int. Cl.
*G06K 19/06* (2006.01)
*B29C 45/37* (2006.01)
(Continued)

(52) U.S. Cl.
CPC .............. *F16L 3/14* (2013.01); *B29C 45/372* (2013.01); *G06K 19/06037* (2013.01);
(Continued)

(58) Field of Classification Search
CPC ...... F16L 3/14; B29C 45/372; B29C 2037/80; G06K 19/06037; G06K 19/06121; B29L 2031/12; H02G 11/006
See application file for complete search history.

(56) References Cited

U.S. PATENT DOCUMENTS 8,397,479 B2   3/2013  Wendig et al.
8,453,424 B2 *  6/2013  Jostmeier ................ F16G 13/16
                                                      59/900
(Continued)

FOREIGN PATENT DOCUMENTS

DE  102005017807  10/2006
DE  102005017808  10/2006
(Continued)

OTHER PUBLICATIONS

Office Action from related Chinese Appln. No. 201980025216.4, dated Mar. 31, 2023. English translation attached.
(Continued)

*Primary Examiner* — Nkeisha Smith
(74) *Attorney, Agent, or Firm* — Grossman, Tucker, Perreault & Pfleger, PLLC

(57) ABSTRACT

An injection-moulded plastic part for a cable carrier, particularly a side part of a chain link produced in an injection moulding process. The injection moulded part has a visible, identifiable marking on a first side, particularly the outside. The at least one marking comprises a data code marking having a 2D code for data encoding which is introduced into the plastic body directly in the injection moulding process so that said marking is provided on the first side to be machine-readable. The invention likewise relates to a corresponding injection moulding tool having a number of first symbol regions and second symbol regions for producing the data code marking in the injection moulding process.

23 Claims, 3 Drawing Sheets

(51) Int. Cl.
  *F16L 3/14* (2006.01)
  *B29C 37/00* (2006.01)
  *B29L 31/12* (2006.01)
  *H02G 11/00* (2006.01)

(52) U.S. Cl.
  CPC .... *G06K 19/06121* (2013.01); *B29C 2037/80* (2013.01); *B29L 2031/12* (2013.01); *H02G 11/006* (2013.01)

(56) References Cited

U.S. PATENT DOCUMENTS

| | | | |
|---|---|---|---|
| 8,666,817 B2* | 3/2014 | DeRoller | G06Q 30/0251 270/52.02 |
| 8,783,571 B2* | 7/2014 | Sakahashi | G06K 19/06056 235/494 |
| 9,352,323 B2* | 5/2016 | Duerr | B01L 9/523 |
| 9,646,235 B2* | 5/2017 | Pranov | G06K 19/06037 |
| 10,853,606 B2* | 12/2020 | Martin | G06V 10/245 |
| 10,922,503 B2* | 2/2021 | Khbeis | G06K 19/0672 |
| 11,151,434 B2* | 10/2021 | Abdo | G01K 3/04 |
| 11,164,059 B2* | 11/2021 | Zhu | G06K 19/06103 |
| 11,244,549 B2* | 2/2022 | Giampavolo | G06K 7/1417 |
| 2008/0041976 A1 | 2/2008 | Bohlmann | |
| 2011/0154800 A1 | 6/2011 | Jostmeier et al. | |
| 2013/0207310 A1* | 8/2013 | Satou | B29C 33/424 264/293 |
| 2015/0159733 A1 | 6/2015 | Blase et al. | |
| 2015/0269468 A1 | 9/2015 | Butz | |

FOREIGN PATENT DOCUMENTS

| | | |
|---|---|---|
| DE | 112004000584 | 10/2008 |
| DE | 102007035981 | 2/2009 |
| DE | 102008024906 | 1/2010 |
| DE | 102008046700 | 3/2010 |
| DE | 102009059054 | 6/2011 |
| DE | 102013223567 | 4/2015 |
| DE | 202011004785 | 6/2015 |
| DE | 102014003985 | 9/2015 |
| DE | 102014220002 | 4/2016 |
| DE | 102014018786 | 6/2016 |
| DE | 202016105773 | 2/2018 |
| EP | 2875944 | 5/2015 |
| EP | 3305498 | 4/2018 |
| JP | 2000120807 | 4/2000 |
| JP | 2008279604 | 11/2008 |
| JP | 2014-176044 | 9/2014 |
| JP | 2014209846 | 11/2014 |
| JP | 2016-93926 | 5/2016 |
| WO | 9855956 | 12/1998 |
| WO | 0209018 | 1/2002 |
| WO | 2004092614 | 10/2004 |
| WO | 2016054647 | 4/2016 |
| WO | 2016/072177 | 5/2016 |

OTHER PUBLICATIONS

Office Action from related Indian Appln. No. 202037042191, dated Mar. 23, 2022. English translation attached.
Hearing Notice from related Indian Appln. No. 202037042191, dated Mar. 24, 2023. English translation attached.
International Search Report from corresponding PCT Appln. No. PCT/EP2019/058926, dated Jul. 9, 2019.
International Preliminary Report on Patentability from corresponding PCT Appln. No. PCT/EP2019/058926, dated Oct. 15, 2020.
Prepared by Joint Technical Committee ISO/IEC JTC 1, Information technology, Subcommittee SC 31, Automatic Identification and data capture techniques, Technical Corrigendum 1 to ISO/IEC 16022:2006/Cor.1:2008(E), Published Oct. 1, 2008, 4 pages.
Prepared by Joint Technical Committee ISO/IEC JTC 1, Information technology, Subcommittee SC 31, Automatic Identification and data capture techniques, Technical Corrigendum 2 to ISO/IEC 16022:2006/Cor.2:2011(E), Published February, 1, 2011, 10 pages.
Prepared by Joint Technical Committee ISO/IEC JTC 1, Information technology, Subcommittee SC 31, Automatic Identification and data capture techniques, Technical Report ISO/IEC TR 24720. 2008(E), First edition Jun. 1, 2008, 38 pages.
Prepared by Joint Technical Committee ISO/IEC JTC 1, Information technology, Subcommittee SC 31, Automatic Identification and data capture techniques, International Standard, ISO/IEC 16022:2006(E), Second edition Sep. 15, 2006, 142 pages.
Prepared by Joint Technical Committee ISO/IEC JTC 1, Information technology, Subcommittee SC 31, Automatic Identification and data capture techniques, International Standard, ISO/IEC 18004:2015(E), Third edition Feb. 1, 2015, 126 pages.
Vella et al., "A new process chain for producing bulk metallic glass replication masters with micro- and nano-scale features", Int. J. Adv Manuf Technol (2015), vol. 76 pp. 523-543, London.
Oda, "Resin molded product for component of motor vehicle, has code symbol comprises plane part, convex part protruded from code symbol formation surface, plane part formed with mirror surface, and outer surface arranged on convex part", WPI/2017 Clarivate Analytics, vol. 2016, No. 37, May 26, 2016.
First Office Action from related Chinese Appln. No. 201980025216. 4, dated Apr. 26, 2022. English translation attached.
Second Office Action from related Chinese Appln. No. 201980025216. 4, dated Oct. 9, 2022. English translation attached.
Office Action from related Japanese Appln. No. 2020-555411, dated Dec. 6, 2022. English translation attached.
Office Action from related Japanese Appln. No. 2020-555411, dated Jun. 13, 2023. English translation attached.

* cited by examiner

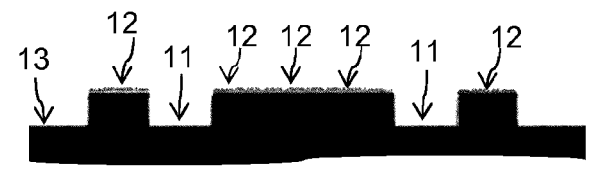
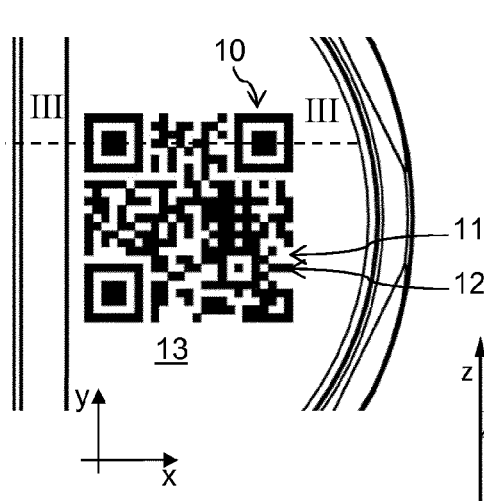
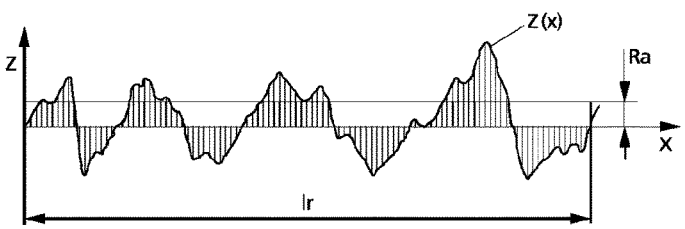
FIG.2B  FIG.6C
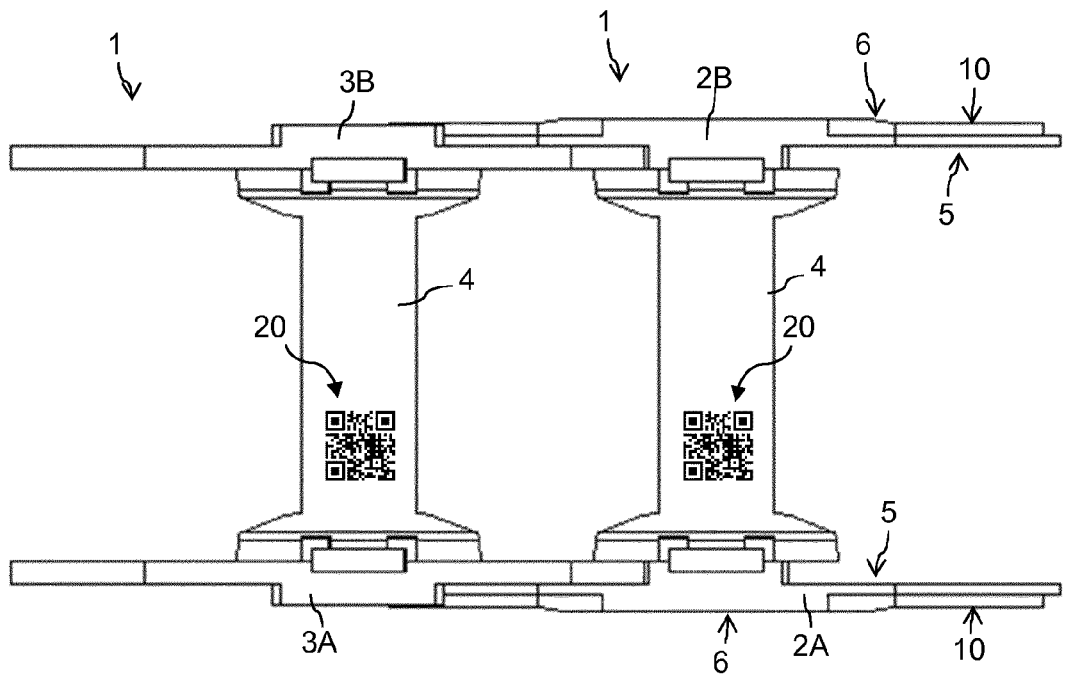
FIG.4

MARKING ON INJECTION MOULDED PARTS FOR ENERGY GUIDING CHAINS

FIELD

The invention generally concerns marking plastic injection moulded parts for energy guiding chains.

BACKGROUND

Energy guiding chains serve for protected dynamic guidance of lines like cables, hoses and the like, between two relatively moveable connecting locations. Energy guiding chains are typically made up of individual chain links which each include one or more plastic injection moulded parts. Plate-like side parts for example for a multi-part chain link are known, which are produced using an injection moulding process in the form of a one-part plastic body. The outside and the inside of the plastic component respectively involve a surface whose nature is determined by the plastic selected, but in particular by the injection moulding tool used. Chain links produced in one piece with an injection moulding method are also known. Using an injection moulding method moulded parts which can be used directly of energy guiding chains can be inexpensively produced on a large scale or in mass production.

The invention more specifically concerns such a plastic injection moulded part of the general kind set forth of an energy guiding chain, for example a side part of a chain link, wherein the injection moulded part is produced in an injection moulding method in the form of a one-piece plastic body having a first side, in particular the outside of the side part, having a first surface, and a second side, in particular the inside of the side part. At least one marking is applied to the plastic body in the injection moulding method and is provided visibly at the first side.

In the injection moulding method, it is possible by virtue of a suitable configuration of the negative shape, to produce markings like for example projecting or recessed inscriptions in or on the surface, for example with an article number and manufacturer. It is also known in injection moulding to apply variable markings, for example relating to the date of manufacture. That is typically effected by a plurality of so-called "casting clocks", that is to say punches which are rotatable in the injection moulding tool and which apply a kind of time stamp to the plastic body, which is generally visible at the outside.

The two kinds of markings as mentioned above are to be found on many injection moulded parts which are available as catalogue products for energy guiding chains from the present applicant (igus GmbH). A marking here signifies in particular an optically readable item of information, whether human-readable and/or machine-readable.

DE 11 2004 000 584 T5 discloses a chain link of an energy guiding chain, to the side parts of which two time stamps are applied using injection moulding in conventional manner to specify the month and the year of manufacture (see FIG. 2 therein).

Marking and identification technology of products now quite generally is increasingly involving the use of so-called 2D codes, in particular matrix codes. For example the so-called QR code®, in particular in accordance with ISO/IEC 18004, or the so-called DataMatrix™ code, in particular in accordance with ISO/IEC 16022, are widespread. This involves in each case optically machine-readable symbols. They afford inter alia a higher information density in comparison with alphanumeric labeling or EAN barcodes. Two-dimensional codes are used for part identification in manufacture, for example in process automation, regarding availability, quality control and so forth. A reliable, quick and precise identification is advantageous even after manufacture, in particular for the user.

A technique which is increasingly being used is direct part identification or direct marking of parts (referred to as "Direct Part Marking": DPM) with two-dimensional codes (2D codes) on parts surfaces. DPM concerns methods of applying a durable marking directly to the surface of a product. In comparison with the subsequent application of labels or the like direct marking is more reliable and easier to automate.

Various DPM technologies are known, see the introduction in WO 2016/054647 A1. For example laser inscription is known which in part is also suitable for plastic parts. Thus for example DE 10 2005 017 807 B4 and DE 10 2005 017 808 B4 from a remote sector describe injection moulded parts for plastic injection valves which have a particular additional plastic layer for laser incription.

Dot peening tools, scribers, needle scribing engraving systems and similar engraving machines for directly introducing a marking into the parts surface are also known. They are used predominantly for metal parts. As in the case of laser engraving this involves intrusive or subtractive methods which subsequently controlledly alter the surface of the component in order for example to apply the desired data code marking with the 2D code.

Non-intrusive procedures are also known, in particular additive marking methods, which mark by subsequently applying a media layer to a surface, for example inkjet marking, see the details in the Technical Report ISO/IEC TR 24720 (first edition 2008).

The foregoing DPM procedures can be integrated into the production process, but subsequently mark components in a separate step. That gives rise to additional complication and expenditure and a safeguard against confusion is not inherent (that is to say false marking of parts is possible).

In the field of metal casting technology it has also already been proposed that parts be provided with an optically readable code marking without an additional working operation, in the context of originally shaping the shaped part.

Patent application WO 02/09018 A1 proposed using a special insert in the production of the ceramic casting mould which produces a negative shape of a desired matrix code, for example a DataMatrix™ code in the hollow mould, for example for a rotor blade of a turbine. In that case the specific insert is integrated into the model (positive form) which serves for manufacture of the hollow mould (negative form) for subsequent moulding from the fluid state. The insert and the model are made from wax-like meltable material. Both are removed by heating from the hollow mould so that what remains is a negative form of the desired 2D code in the hollow mould.

A further approach for marking metal casting parts during the original moulding process (original moulding from the fluid state) is described in patent DE 10 2008 024 906 B3. That is intended to permit manipulation-secure marking of castings during the original shaping process. In that arrangement there is provided a punch which is adjustable in respect of coding and which produces variably adjustable negative shapes for the matrix code elements at the mould wall which is towards the metal melt and which the casting operation fills with molten material to form a 2D code. In that way the code can be re-set from one part to the next. Such a moulding tool is complex, cost-intensive and maintenance-intensive and susceptible to faults.

The two above-described approaches from casting technology are not readily suitable for plastic injection moulding methods using relatively high pressure (original moulding from the plastic state).

In relation to plastic injection moulded parts for energy guiding chains there is the further difficulty that the finished parts are to be of high strength and in operation are typically exposed to wear. Such parts comprising special plastic can therefore be only limitedly reliably marked, if at all, with usual procedures for direct marking. Laser inscription is also not readily possible with all plastics.

Marking injection moulded parts with additional information however is also desirable in the course of the manufacture of energy guiding chains using technical plastics.

SUMMARY

Accordingly, an object of the invention is to provide an inexpensive and reliable procedure which makes it possible to mark injection moulded parts of an energy guiding chain. The procedure should be in particular confusion-free and as reliable as possible, even when dealing with very high numbers of items.

There is firstly proposed a plastic injection moulded part of an energy guiding chain, for example a side part of a chain link, which is produced in the injection moulding method in the form of a one-piece plastic body. The plastic body has a first side, for example an outside of the side part, having a first surface, and a second side, for example an oppositely disposed inside of the side part. In that case at least one marking can already be introduced into the plastic body in the course of manufacture using the injection moulding method so that the marking is visible at the first side.

In the simplest embodiment it is proposed according to the invention that the marking includes a data code marking with a 2D code which is already introduced into the plastic body in manufacture using the injection moulding method and is provided in machine-readable manner at the first side. The 2D code serves for data coding or encodes data and is suitable for detection of such data by a data detection device. Detection can be effected optically, in particular electro-optically, with a commercially usual data detection device or code reading device.

According to the invention the data code marking is thus produced together with the actual injection moulded body in the course of manufacture thereof using the injection moulding method or in a moulding tool or injection moulding tool of suitable configuration. Confusion is excluded by virtue of the fixed association in the moulding tool.

The data code marking is or becomes an integral constituent part of the injection moulded body and therefore cannot be separated therefrom, or at any event not without destruction thereof.

The manufacturing costs for such a special data code marking are minimised by integration into the injection moulding method as there are only one-off costs for manufacture or subsequent adaption of the injection moulding tool.

Production using the 2-component method is basically possible, but material-unitary production of the data code marking with the 2D code from one and the same plastic, which the injection moulded body comprises, is preferred. The 2D code is thus produced or shaped in one piece with the plastic body, in particular with a unitary material from the same plastic. That solution allows particularly inexpensive manufacture using relatively simple tools.

In a preferred embodiment a matrix code in an already widespread or standardised format is used as the 2D code in the data code marking. By way of example a QR code, in particular in accordance with ISO/IEC 18004, is particularly preferred. In the present case the term QR code is also used to denote variants thereof like micro-QR-code, SQRC, iQR code or Design-QR-code and so forth.

The format of the so-called DataMatrix™ code in accordance with ISO/IEC 16022 or also a so-called GS1 Data-Matrix is also widespread. Other known 2D codes are also possible, for example an EZ code®.

The term "code" is used here to denote reproduction of data in an optically recognisable symbol. Such codes for encoding purposes use a spatially two-dimensional arrangement of two optically different types of surface elements, code fields or so-called symbol modules (hereinafter referred to as symbol elements) which together compose the actual data code symbol. Hereinafter the two different element types are referred to as first symbol elements and second symbol elements.

A symbol element in the present case is a surface region which represents a 2D code symbol by optical action and/or shape together with further symbol elements. Symbol elements of the first kind have a very substantially similarly optical action and/or shape and have optically the same action as each other. A corresponding point applies to the second symbol elements. The first symbol elements however differ significantly in their optical action and/or shaping from the second symbol elements. Conventional printed matrix codes involve square cells of typically equal size as symbol modules in two different contrasting colours which can be optically well distinguished, generally black/white.

The first symbol elements and the second symbol elements are in that case integral constituent parts of the plastic body, that is to say they are formed thereby, without for example application or printing thereon being required.

A preferred embodiment however provides that the first symbol elements have a different (actual) surface nature from the second symbol elements. The differing surface nature of the symbol elements makes it possible to recognise an optical contrast in the sense of differing light reflection, in particular even without different colouring of the substances representing the symbol elements.

With the approach according to the invention preferably one and the same plastic is used for the energy guiding chain component and the data code marking. Different colouring of the symbol elements is not provided.

A further simplification in manufacture can be provided if the first symbol elements have the same surface nature which a first surface of the injection moulded part also has, at any event over a predominant surface proportion of the first surface. In that case the second symbol elements can have in particular a surface profile differing therefrom or different profile properties in respect of the actual surface nature. In that respect the term surface profile means the actual surface profile in cross-section along at least one of the main directions, preferably along both directions. The profile preferably has continuously identical or optically equivalent properties over the surface of all second symbol elements. The surface or profile property in that case can be unordered, irregular and/or chaotic.

The first and second symbol elements can differ in particular in respect of their roughness characteristics (DIN EN ISO 4287).

A preferred embodiment provides in particular that the first symbol elements have a smoother surface, that is to say a roughness depth which is smaller in amount than the second symbol elements. In that case all first symbol elements have a surface roughness which is identical in the technical sense in relation to each other, but a surface nature which is demonstrably different in relation to all second symbol elements. The roughness depth can be ascertained using per se known technical methods at the surface of the symbol elements by measurement procedures.

A preferred embodiment provides that the first symbol elements have an arithmetic mean roughness value Ra in the region of 0.5 to 3.5 μm (micrometer), preferably in the region of 0.75 to 2.75 μm, and the second symbol elements have an arithmetic mean roughness value Ra in the region of 5 to 12 μm, preferably in the region of 6.50 to 10.50 μm. Measurement of the arithmetic mean roughness value Ra can be effected in particular in accordance with the standard DIN EN ISO 4288 (Version 1997) using a surface profile method, with Ra as a standardised parameter in accordance with DIN EN ISO 4287 (Version 1998).

To simplify mould production it can be provided that the first symbol elements are arranged in flush surface relationship or in level-plane relationship in comparison with a region of the first surface, adjoining the data code marking. The first symbol elements can transit steplessly into the surrounding surface of the injection moulded part. That arrangement simplifies mould construction as optionally in that way particular machining is necessary only for the second symbol elements.

Particularly simple initial manufacture or subsequent adaptation of a suitable or existing injection moulding tool is made possible if the second symbol elements are formed by regions which project or are raised with respect to the surface of the first side of the injection moulded part. That has the advantage in particular in relation to thinner-walled components, of not changing the (macroscopic) geometry of the injection moulded part. It is advantageous if the marking does not cause any reduction in wall thickness because chain links, in particular side plates of energy guiding chains, are exposed at times to very high forces in operation thereof.

For optical detection it is advantageous if the average difference in height between the surfaces of the first and second symbol elements is less than or equal to 0.5 mm. In that way even symbol elements with a relatively small, for example square base surface, can be reliably read even with a severely inclined orientation relative to the optical axis of the data detection device. In addition the component geometry is not perceptibly altered.

The data code marking can be produced in particular together with a structural region of the injection moulded part, that is to say without additional separate portions for the marking or corresponding material usage.

Alternatively or additionally it is possible for the data code marking in total to be provided in a region of the first side of the injection moulded part, that is recessed with respect to the first surface. That protects the marking inter alia from abrasion for example at interference edges or the like. It is equally possible in addition or alternatively to form the second symbol elements by regions which are recessed with respect to the surface of the first side of the injection moulded part, or are set back with respect thereto. The data code marking irrespective thereof should be provided in a well visible surface region of the plastic body, that as far as possible is not susceptible to wear or has only a little such susceptibility.

Irrespective of the selected surface nature of both kinds of symbol elements of the 2D code a preferred embodiment provides that the second symbol elements, by virtue of their surface with identical light irradiation, cause or create a greater light scatter or a more greatly pronounced diffuse reflection, than the first symbol elements. Differing light scatter, without a change in the material nature, can make a difference in brightness optically or visually perceptible. In other words the symbol elements are preferably not coloured but provide an optical contrast, merely by virtue of differing light scatter.

Optical contrast or optical distinguishability of the different symbol elements is thus preferably caused by different optical scattering properties. The first symbol elements can for example have a degree of roughness which is technically as slight as possible and accordingly act approximately like a usual reflection surface which relatively well reflects incident light (angle of incidence=angle of reflection, having regard to the material-dependent degree of absorption). In comparison by virtue of the predetermined different kind of surface nature, for example by suitable roughening in the injection moulding tool, the second symbol elements have predetermined, markedly greater optical scatter effect in regard to incident light. The greater light scatter of the second symbol elements in comparison with the first symbol elements can be ascertained for example by way of the scatter coefficients or the scatter cross-section with per se known optical methods, and possibly optimised.

Tests have shown that the greater light scatter by the second symbol elements in comparison with the first already offers sufficient optical distinguishability in order to reliably recognise conventional matrix codes, for example a QR code, with commercially usual devices, for example an ordinary smartphone.

Light scatter by the second symbol elements should ideally come as close as possible to diffuse reflection (Lambert light sources). For that purpose the second symbols, in particular at their surfaces, can have a high degree of roughness relative to the wavelength range of visible light. The first and second symbol elements can basically have different degrees of light remission which can differ for example by at least 20%, with respect to the same measuring arrangement. The first symbol elements can have a smooth in part reflecting surface.

In a preferred embodiment the second symbol elements also create optically substantially isotropic light scatter. On the assumption of a spherical coordinate system with a pole axis or a Z-axis parallel to the surface normal at the base surface of the 2D code as an equatorial plane (for example flush at the surface of the first symbols) substantially isotropic light scatter means here that the quality of the light scatter in a selected direction with a constant azimuth angle is substantially not dependent on the polar angle. That can generally be tested visually, for example if upon rotation of the component about the Z axis and with the light incidence remaining the same, no substantial change in brightness at the second symbol elements can be perceived by the observer.

Such substantially isotropic light scatter can be achieved for example by aperiodic, for example technically chaotic, surface profiles which are so set that the quantitative deviation over the entire polar angle range (from 0 to 2 π) is less than a predetermined threshold, for example over the entire polar angle range it has not more than a 15% deviation. An (isotropic) light scatter which is approximately the same in all directions can be achieved in particular if the roughness or the deviation from an ideally smooth surface at the second symbol elements is very substantially independent of both surface directions or is random.

Anisotropic light scatter would also be conceivable, for example by diffraction gratings or similar periodic structures, for example regular hatchings of the surface. An advantage of isotropic light scatter however is that the relative orientation of the data code marking relative to the optics of the data detection device, in respect of the polar angle, is thus immaterial. That is advantageous in particular in the case of energy guiding chains because they do not have a predetermined orientation in their end use. Energy guiding chains are used in the most widely varying spatial orientations and in most applications form two runs which are turned through 180° relative to each other.

The creation according to the invention of the data code marking with the 2D code in injection moulding or in the injection moulding tool makes it possible in particular that the 2D including the visible surfaces of the first and second symbol elements is produced in one piece from the same plastic as the actual plastic body. In that respect in particular for injection moulded parts of energy guiding chains usual polymers or plastic mixes, in particular with a predominant proportion by weight of polyamide, optionally with reinforcing fibres, can be used. The data code marking is possible in particular with colouration of the plastic which remains the same throughout, even with a visually black plastic, that is to say even without colouration which differs in respect of the material involved, in the two types of symbol elements in the 2D code.

The data code marking according to the invention is advantageous in particular in combination with injection moulded parts comprising fibre-reinforced injection-mouldable plastic.

The proposed solution makes it possible in particular to produce the data code marking with the 2D in off-tool mode with the plastic body so that it is already machine-readable without any subsequent working. The data code marking can consequently be produced in particular in the form of a direct marking together with the injection moulded part in the same injection moulding mould. That allows particularly inexpensive marking with a 2D code or a matrix code.

Tests show that an optically clearly visible different surface nature of the first symbol elements with respect to the second symbol elements can be achieved if on the one hand the first symbol elements have a surface nature which can be produced by spark die erosion of the moulding tool by electroerosive processing or spark-erosive removal (DIN 8580). On the other hand a suitable surface nature for the second symbol elements can be achieved if their surface nature corresponds to laser engraving, in particular depth laser engraving or 3D laser engraving of the injection moulding mould (moulding tool). In that case the first surface of the first side of the injection moulded part outside the data code marking can also correspond to spark die erosion. In that case the first side can be as intended an outward side of the injection moulded part. The second side of the injection moulded part can have a second surface which at least predominantly has the same surface nature as the first side, that is to say also a surface quality created by spark erosion (EDM: electrical discharge machining)

By electrical discharge machining it is possible to achieve comparatively small roughness depths in respect of the first surface and possibly the first symbol elements, that is to say desirably smooth surfaces. A further advantage is that a different method is required in tool production of the moulding tool only for the optical contrast of the second symbol elements, for example laser machining of the injection moulding tool.

In terms of data technology the data code marking is preferably applied by way of a permanent marking which remains the same over all injection moulded parts, that is to say invariably in the injection moulding tool. In that case the data encoded by the 2D code can include in particular a manufacturer-related URL identifier or a PURL identifier. In that way the user, for example a maintenance engineer, using a commercially usual smartphone with software for scanning the 2D code, for example a QR code reader, can be taken in the simplest way on site from the energy guiding chain to a suitably predetermined Internet page of the manufacturer.

Particularly for recognising product counterfeiting it is advantageous if the data encoded by the 2D code include encrypted and/or injection moulded part-specific data contents. For that purpose for example it is possible to use an SQRC code (secure QR code).

Besides the specific data code marking the injection moulded part can further have a conventional user-readable marking, in particular a time marking, which makes it possible to establish the time of manufacture. That can also be introduced into the plastic body in the injection moulding process, for example by means of time-variable casting clock marking punch. Such conventional user-readable markings are preferably provided at the first side of the injection moulded part, at which the data code marking is also provided.

The invention can be applied to the production of multi-part or one-part chain links of an energy guiding chain and the component parts thereof (for example separating bars, transverse plates, end fixings, tension relief means and so forth). The data code marking according to the invention with 2D code can thus be provided for example both at one or both side parts of a chain link (chain side plates) and also at at least one opening bar connecting the side parts. Accordingly each individual injection moulded part can respectively have its own fixedly associated 2D code in the corresponding data code marking. Thus inter alia each individual part of the energy guiding chain is easily identifiable for the user. The most widely varying range of individual parts is already possible for energy guiding chains of a given production series, depending on inter alia deflection radius, chain width, chain height and so forth, which in part can only be distinguished with difficulty by users.

The invention consequently also concerns a plastic injection moulding tool for the production of injection moulded parts of plastic for energy guiding chains. The injection moulding tool can be produced in particular from steel. According to the invention the injection moulding tool has a predetermined marking region which is fixedly predetermined in the injection moulding tool for a 2D code which is incorporated or formed in the shaping wall for delimiting the injection moulding cavity. The marking region has a number of first symbol regions which in particular are produced by spark die erosion, for example together with production of the delimiting wall for the first surface of the injection moulded part. In addition the marking region in the moulding tool has a number of second symbol regions which are of a different surface nature, being in particular of a greater roughness depth than the first symbol regions. The second symbol regions can in that case be provided or produced in particular in the course of initial manufacture or also subsequently, in particular by laser engraving of the injection moulding tool. In particular depth laser engraving or 3D laser engraving of the injection moulding mould or the moulding tool is considered as the laser engraving procedure.

The first symbol regions therefore serve to create the first symbol elements and the second symbol regions serve to create the second symbol elements. The term injection moulding tool is used in particular to denote a mould half (half-shell portion) of a two-part moulding tool as it is sufficient if the data code marking is on one side.

The proposed data code marking of energy guiding chain parts affords a wide range of different advantages in use. An energy guiding chain injection moulded part with a 2D code can afford different additional uses. Thus for example assembly and/or maintenance can be simplified or aided for example by calling up information relating to the construction, assembly and/or maintenance of the energy guiding chain. Replacement parts ordering can also be made possible by using the 2D code. In that respect the user can be guided by data detection of the 2D code with a smartphone, tablet or the like, directly on the plastic injection moulded part to a manufacturer website associated for example with the product series relating to that plastic injection moulded part, for example by way of an URL in the QR code. The website can include product information like for example assembly or maintenance instructions, specification data for the individual parts and/or energy guiding chain and so forth. An ordering function can additionally or alternatively be provided for ordering spare parts.

In particular each individual part of a given energy guiding chain series can be provided with a uniquely associated specific 2D code in order to afford additional uses of that kind.

Furthermore, possibly after scanning of the 2D code, supplemental queries, for example in regard to at least one parameter of the plastic injection moulded part, can be directed in web-based relationship to the user to supply specifically targetted information. It is also conceivable to invoke an application on the terminal device, that supplies additional uses relating to the product.

The data code marking can also be employed for recognising product counterfeiting, for example on the basis of encrypted additional data. Additionally and/or alternatively the user can be guided by data detection of the 2D code on the plastic injection moulded part to a manufacturer website associated with the plastic injection moulded part. In that way supplemental queries, in particular in regard to at least one detection feature of the plastic injection moulded part, can be directed to the user, for example to provide information about the authenticity or a counterfeit.

BRIEF DESCRIPTION OF THE DRAWINGS

Further details, features and advantages of the invention will be apparent without limitation from the detailed description hereinafter of preferred embodiments by way of example with reference to the accompanying drawings in which:

FIGS. 2A-2B show a side plate (outer plate) in the form of an injection moulded part of a chain link as shown in FIG. 1 as a side view (FIG. 2A) and an enlargement thereof (FIG. 2B) to illustrate a data code marking;

FIG. 3 shows a diagrammatic cross-section of the surface profiles of first and second symbol elements in the data code marking shown in FIGS. 2A-2B along section line in FIG. 2B;

FIG. 4 shows a diagrammatic plan view of chain links similar to FIG. 1, here with a data code marking on an opening bar;

FIG. 6C shows a diagrammatic view illustrating the principle relating to the arithmetic mean roughness value Ra (parameter in accordance with DIN EN ISO 4287: 1998) at an aperiodic surface profile ($Z(x)$)—similarly to the second symbol elements in FIG. 3—over a measuring distance ($1r$).

DETAILED DESCRIPTION

Figure 1:
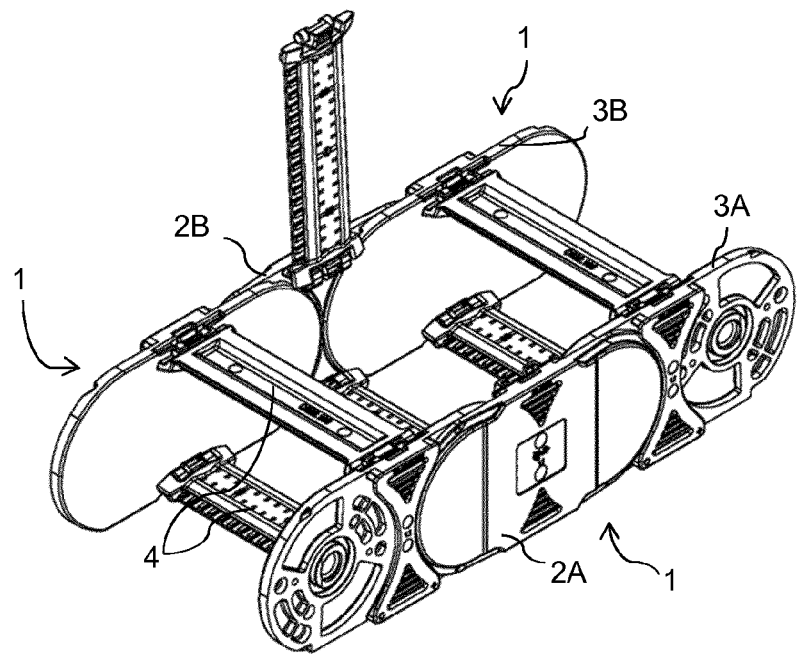
FIG. 1 shows a perspective view of a portion of an energy guiding chain comprising chain links of per se known construction.

FIGS. 1 and 4 show a portion of a known energy guiding chain comprising individual chain links 1, for example the product series bearing the trade name E4.1L from igus GmbH (D-51147 Cologne) which is of a particularly light structure and nonetheless very robust. FIG. 1 shows three chain links 1, here a central one having two so-called outer plates 2A, 2B as side plates and two further so-called inner plates 3A, 3B. The outer plates 2A, 2B overlap the inner plates 3A, 3B and each two side plates 2A, 2B; 3A, 3B are connected together to constitute chain links 1 by way of releasable transverse bars 4 (opening bars). The side plates 2A, 2B; 3A, 3B form lines of plates which extend over the entire length of the energy guiding chain. The energy guiding chain shown in FIG. 1 and FIG. 4 respectively is described in greater detail in WO 2014/161761 A1.

The side plates 2A, 2B; 3A, 3B and transverse bars 4 are plastic parts comprising a technically hard and tough plastic, for example polyamide with reinforcing fibres, and produced using injection moulding. The specific structure of the energy guiding chain and the chain links 1 however is not an important consideration in this respect, the invention can be applied to any injection moulded parts for energy guiding chains. The injection moulded parts 2A, 2B; 3A, 3B; 4 are produced in particular from a substantially light-impervious, as far as possible opaque, in particular black or highly dark-coloured plastic. The side plates 2A, 2B; 3A, 3B and transverse bars 4 each have—in relation to the receiving space for lines in the chain links 1—an inside 5 and an opposite outside 6 and are overall of a relatively shallow, for example plate-like, configuration.

Figure 2A:
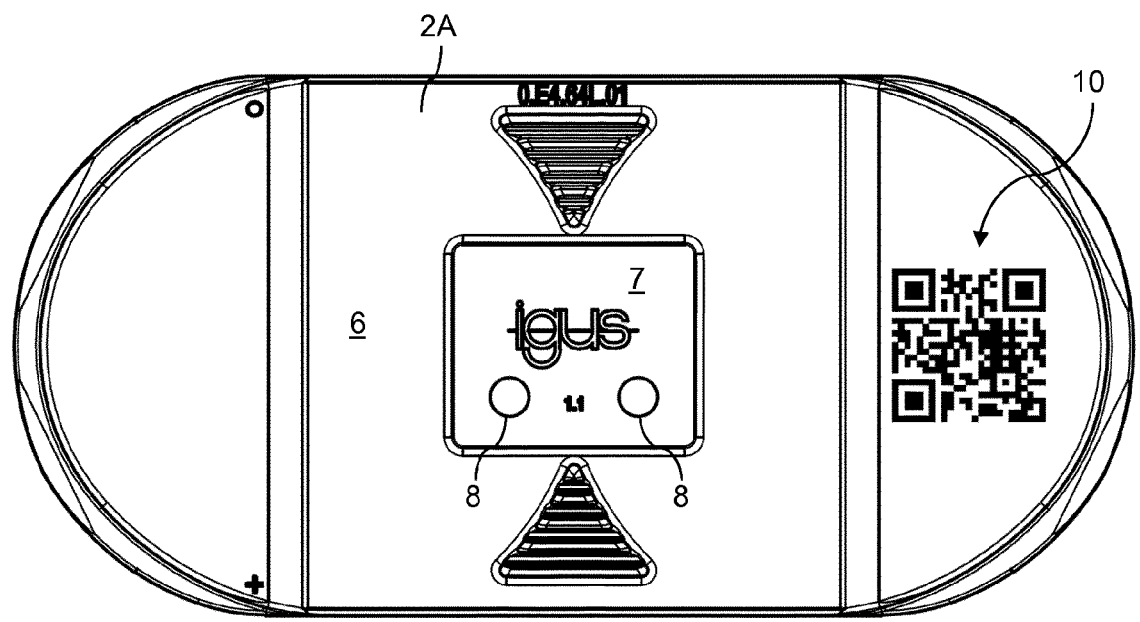

FIGS. 2A-2B show purely by way of example to illustrate the invention an outer plate 2A of a chain link 1 as shown in FIG. 1, in which respect irrespective any kind of side plates or one-part chain links are considered. In a laterally projecting central region of the outside 6 of the side plate 2A there is a marking surface 7 with a manufacturer inscription and two time stamp regions 8, in which for example the date of manufacture or the month and year of manufacture are specified by rotatable casting clock marking punches.

In an end inwardly displaced region of the outside 6 of the outer plate 2A or the chain link 1 there is a data code marking 10 with a flat two-dimensional matrix code, here a QR code in accordance with ISO/IEC 18004 with for example in the form of a square code symbol with individual fields depending on the respective version 21×21 to 177× 177 for symbol modules or symbol elements. The data code marking 10 is clearly visible in operation and is of a size of for example at least 15×15 mm in order to be machine-readable even from a given distance for a data reading device, for example a smartphone. The coding of a QR code in accordance with ISO/IEC 18004 as a data code marking 10 is known per se and is not described in greater detail here. The additional benefit can be tested by scanning the QR code 10 in FIG. 2A.

FIG. 3 is a diagrammatic view in section in a direction along the line in FIG. 2A, here by way of example restricted to the position marker shown at top left in FIG. 2A. As FIG. 3 shows the individual symbol elements, namely first symbol elements 11 and second symbol elements 12, are respectively of a different surface nature. The second symbol elements 12 have in particular a rougher cross-sectional profile, that is to say a greater roughness depth than the first symbol elements 12. The more greatly pronounced roughness depth of the second symbol elements 12 can be measured in particular by reference to the arithmetic mean roughness value Ra which is to be perceptibly greater for the second symbol elements 12 than for the first symbol elements 11, for example by a factor of at least twice, preferably>3. The first symbol elements 11 which are smoother in terms of surface can have the same surface nature as the remaining or predominant first surface 13 at the outside 6 of the injection moulded part 2A. The surface or cross-sectional profile of both kinds of symbol elements 11 and 12 respectively is of a similar nature in both surface directions x, y of the plane in FIG. 2B and is only diagrammatically and representatively illustrated in FIG. 3. The greater roughness of the second symbol elements 12 is so set that they cause a markedly greater light scatter effect than the first symbol elements 11. In addition the surface profile of the second symbol elements 12 in both surface directions x, y of the main plane of the injection moulded part 2A is aperiodic to cause substantially isotropic light scatter.

FIG. 4 shows as a further feature of an injection moulded part with a QR code as the data code marking 20 a transverse bar or opening bar 4 in the geometry shown in FIG. 1. An associated unique code can be individually allocated to each component optionally in each structural size, which code is encoded in the 2D code of the data code marking 10 and 20 respectively and is communicated for example by way of the recognised URL as the query parameter to a manufacturer Internet page.

Figure 5:
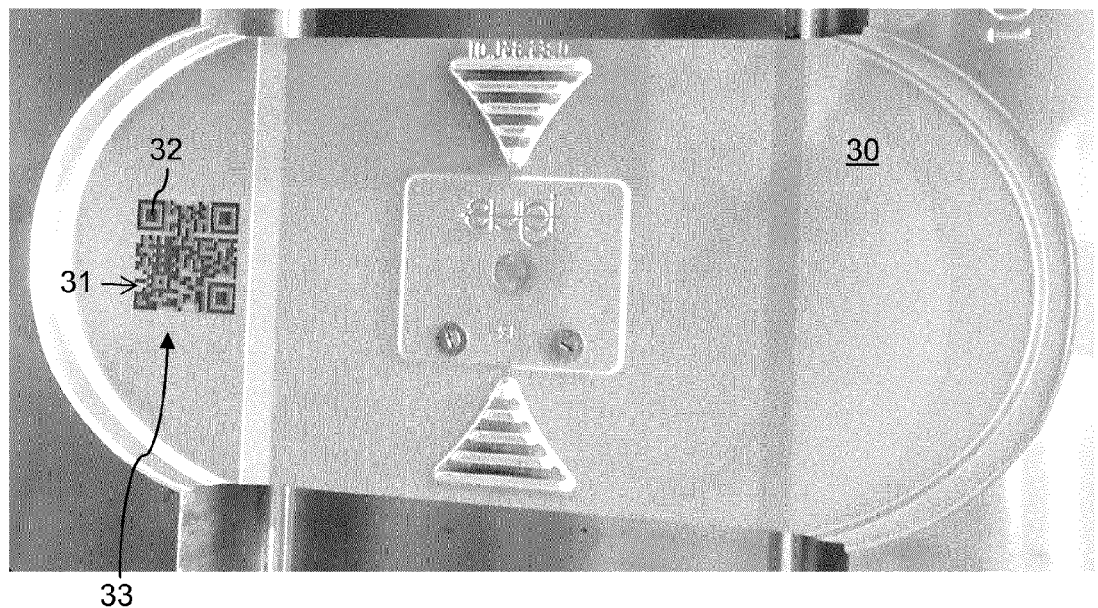
FIG. 5 shows a photograph of a mould half of an injection moulding tool for production of a side plate as shown in FIGS. 2A-2B.

FIG. 5 shows a photograph of a mould half 30 of steel of a plastic injection moulding tool for production of an outer plate 2A, 2B as shown in FIGS. 1-2. A marking region 33 is invariably incorporated in the mould half 30 of the injection moulding tool shown in FIG. 5 for off-tool production of the data code marking 10 together with the injection moulded part 2A, 2B (see FIG. 1), directly in the injection moulding method. The marking region 33 corresponds to the negative form of the desired 2D code, for example a QR code, of the data code marking 10 shown in FIGS. 2A-2B. Correspondingly the marking region 33 has first in part square and field-like symbol regions 31. The symbol regions 31 can be flush with the surface and can be designed without any difference in the surface nature relative to the rest of the smooth delimiting wall of the mould half 30, in particular by spark die errosion (EDM: electrical discharge machining). The marking region 33 further has second in part square and field-like symbol regions 32 which are recessed with respect to the symbol regions 31. The second symbol regions 32 can be subsequently introduced by depth laser engraving or 3D laser engraving of the mould half 30 or the injection moulding mould. Laser engraving for production of the second symbol regions 32 allows sharp-edged transitions and parameter settings for producing the desired aperiodic, isotropically scattering surface profile of the second symbol elements 12 (see FIG. 3).

Such a mould half 30 can be used in off-tool fashion to produce a data code marking 10 or 20 (FIGS. 2A-2B, FIG. 4) in unitary material relationship with the plastic body of the injection moulded part 2A, 2B; 3A, 3B and 4. Subsequent machining is not required for machine-readable recognition of the code of the data code marking 10 and 20.

Figure 6A:
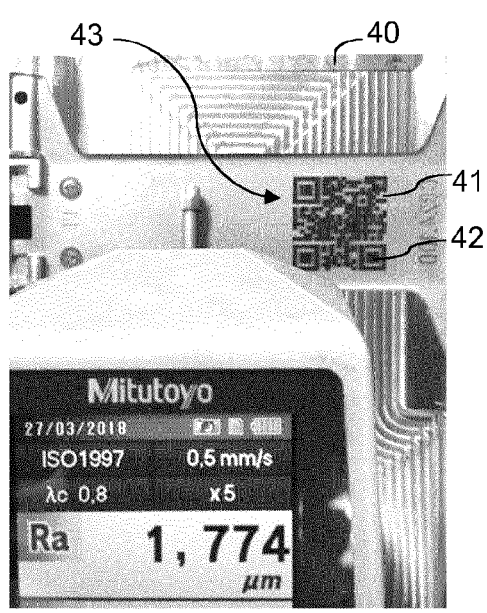
FIGS. 6A-6B show photographs of a measurement of the roughness depth Ra for first symbol elements (FIG. 6A) and second symbol elements (FIG. 6B) of the data code marking by a measuring device in accordance with DIN EN ISO 4288: 1997 at a mould half of an injection moulding tool for the production of an opening bar as shown in FIG. 4.
Figure 6B:
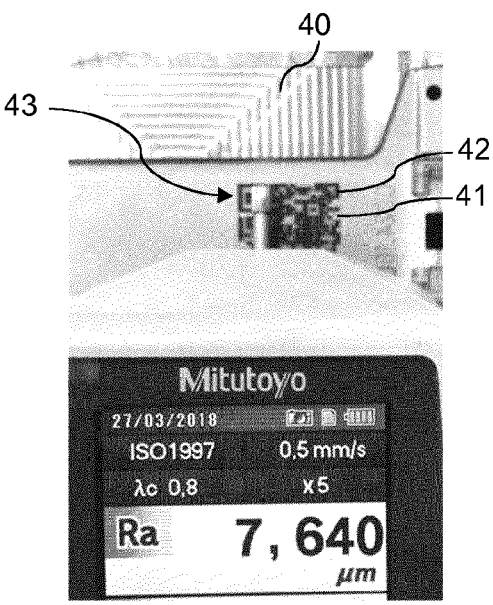

FIGS. 6A-6B show a further mould half 40 of steel for producing an opening bar 4 as shown in FIG. 4. FIGS. 6A-6B also show by way of example measurements of the roughness depth, here the arithmetic mean roughness value Ra, using the surface profile method in accordance with DIN EN ISO 4288 (Version 1997) at symbol regions 41, 42 appropriately produced by electro-erosion or laser engraving. The first symbol regions have the same surface nature as the rest of the predominant surface 13 of the injection moulded part 4. It is to be noted that approximately the same roughness depth can be formed in the injection moulding method at the surface 13 of the plastic injection moulded part, that is to say even structures in the micrometer range and possibly even the sub-micrometer range of the moulding tool are produced in relatively true to shape fashion in the finished injection moulded part 2A, 2B; 3A, 3B and 4. Thus the optical light scatter properties of the surface produced by the symbol regions 32 and 42 (actual surface profiles) can be empirically optimised at the second symbol elements 12.

Comparative measurements on prototypes show that with the moulding tools shown in FIGS. 5 and 6A-6B first symbol elements 11 (and a first surface 13) can be achieved with an arithmetic mean roughness value Ra in the region of 0.75-2.75 µm, in particular less than 2 µm, and on the other hand surface profiles at the second symbol elements 12 with an arithmetic mean roughness value Ra in the region of 6.50-10.50 µm or greater. Correspondingly QR codes 10 and 20 introduced into the plastic body in the injection moulding method can be readily detected optically from widely different angles with commercially available smartphones.

FIG. 6C shows as the roughness parameter the arithmetic mean roughness value Ra as the parameter in accordance with DIN EN ISO 4287 (1998). Ra is the arithmetic mean value from the amounts of all profile values. The profiles can also be measured when looking at other parameters, like for example the averaged roughness depth Rz, by means of an electrical surface profiling device. FIG. 6C shows Z(x) purely diagrammatically an actual surface profile, this does not involve a measurement result. Very smooth surfaces can be achieved by spark die erosion as the delimiting walls of the mould halves 30, 40 so that pronounced peaks and troughs in the surface profile of the injection moulding tool and thus the injection moulded part are avoided and Ra is informative.

LIST OF REFERENCES

FIGS. 1-2A, 2B
1 chain link (of an energy guiding chain)
2A, 2B outer plate
3A, 3B inner plate
4 transverse bar (opening bar)
FIGS. 3-4
2A side plate (for example outer plate)
4 transverse bar (opening bar)
5 inside
6 outside
7 marking surface
8 time punch
10, 20 data code marking (for example QR code)
11 first symbol elements 12 second symbol elements
13 first surface
x, y surface directions (in the main plane)
FIGS. 5-6
30, 40 mould half
31, 41 first symbol regions
32, 42 second symbol regions
33, 43 marking region

What is claimed is:

1. A chain link of an energy guiding chain, comprising:
at least one plastic injection moulded part in a form of a one-piece plastic body formed of a plastic with a colouration that is a same throughout, which has a first side having a first surface, a second side, and at least one marking visible at the first side,
wherein the at least one marking includes a data code marking with a 2D code that is a QR code,
wherein the data code marking with the QR code is injection moulded as a structure of the one-piece plastic body from a visually black plastic and is machine-readable at the first side, and
wherein the at least one injection moulded part is produced from a fibre-reinforced plastic having a predominant proportion by weight of polyamide with reinforcing fibres.

2. The chain link according to claim 1, wherein the QR code is in accordance with ISO/IEC 18004.

3. The chain link according to claim 1, wherein the 2D code is formed of the plastic of the one-piece plastic body such that the 2D code is unitary with the one-piece plastic body.

4. The chain link according to claim 1, wherein the 2D code includes first symbol elements and second symbol elements, wherein the first symbol elements have a different surface nature from the second symbol elements.

5. The chain link according to claim 4, wherein the first symbol elements and the first surface of the first side have a same surface nature and/or the second symbol elements have a different surface profile from the first surface.

6. The chain link according to claim 4, wherein the first symbol elements have a lesser roughness depth than the second symbol elements.

7. The chain link according to claim 4, wherein the first symbol elements have an arithmetic mean roughness value in a range of 0.5 to 3.5 pm, and the second symbol elements have an arithmetic mean roughness value in a range of 5 to 12 pm.

8. The chain link according to claim 4, wherein the first symbol elements lie in level-plane relationship with the first surface of the first side in a region adjoining the data code marking.

9. The chain link according to claim 4, wherein the second symbol elements are formed by regions projecting with respect to the first surface of the first side, and wherein the first symbol elements and the second symbol elements have a difference in height, wherein the difference in height is less than 0.5 mm.

10. The chain link according to claim 4, wherein the data code marking is provided in a region of the first side that is recessed with respect to the first surface, and/or the second symbol element is formed by regions recessed with respect to the first surface of the first side.

11. The chain link according to claim 4, wherein the second symbol elements produce greater light scatter than the first symbol elements.

12. The chain link according to claim 11, wherein the second symbol elements produce substantially isotropic light scatter and/or have an aperiodic surface profile.

13. The chain link according to claim 4, wherein the 2D code, including a visible surface of the first symbol elements and the second symbol elements, is formed of the plastic of the one-piece plastic body such that the 2D code is unitary with the one-piece plastic body.

14. The chain link according to claim 1, wherein the 2D code is machine-readable without re-working.

15. The chain link according to claim 1, wherein the 2D code includes at least one URL identifier associated with the chain link.

16. The chain link according to claim 15, wherein data encoded by the 2D code includes encrypted and/or injection moulded part-specific data.

17. The chain link according to claim 1, wherein the at least marking further includes a user-readable time marking at the first side.

18. The chain link according to claim 1, wherein the chain link further comprises another injection molded part, which is an opening bar with a second data code marking with a QR code.

19. The chain link according to claim 1, wherein data encoded by the 2D code includes data which directs a terminal device reading the data to a manufacturer-related internet website which is associated with the plastic injection moulded part.

20. The chain link according to claim 1, wherein data encoded by the 2D code includes data to detect product counterfeiting.

21. The chain link according to claim 1, wherein the at least one plastic injection moulded part is a side part, the first side is an outside of the side part and the second side is an inside of the side part.

22. A chain link of an energy guiding chain, comprising:
at least one plastic injection moulded part in a form of a one-piece plastic body formed of a plastic with a colouration that is a same throughout, which has a first side having a first surface, a second side, and at least one marking visible at the first side,
wherein the at least one marking includes a data code marking with a 2D code that is a QR code,
wherein the data code marking with the QR code is injection moulded as a structure of the one-piece plastic body from a visually black plastic and is machine-readable at the first side, and
wherein the 2D code includes at least one URL identifier associated with the chain link.

23. A chain link of an energy guiding chain, comprising:
at least one plastic injection moulded part in a form of a one-piece plastic body formed of a plastic with a colouration that is a same throughout, which has a first side having a first surface, a second side, and at least one marking visible at the first side,
wherein the at least one marking includes a data code marking with a 2D code that is a QR code,
wherein the data code marking with the QR code is injection moulded as a structure of the one-piece plastic body from a visually black plastic and is machine-readable at the first side, and
wherein data encoded by the 2D code includes data which directs a terminal device reading the data to a manufacturer-related internet website which is associated with the plastic injection moulded part.

* * * * *